United States Patent [19]

Charpak

[11] Patent Number: 5,604,783
[45] Date of Patent: Feb. 18, 1997

[54] MEDICAL IMAGING DEVICES USING LOW-DOSE X OR GAMMA IONIZING RADIATION

[76] Inventor: Georges Charpak, 2, rue de Poissy, 75005 Paris, France

[21] Appl. No.: 609,208

[22] Filed: Mar. 1, 1996

[30] Foreign Application Priority Data

Mar. 3, 1995 [FR] France .................................. 95 02518

[51] Int. Cl.⁶ .................................................. G01T 1/185
[52] U.S. Cl. ........................................ 378/146; 250/385.1
[58] Field of Search .............................. 378/146, 19, 62; 250/374, 385.1

[56] References Cited

U.S. PATENT DOCUMENTS

| 4,317,038 | 2/1982 | Charpak | 250/385.1 |
| 5,521,956 | 5/1996 | Charpak | 378/146 |

FOREIGN PATENT DOCUMENTS

4123871  1/1992  Germany.

OTHER PUBLICATIONS

Nuclear Instruments and Methods in Physics Research A283 (1989) pp. 431–435, "Multiwire Proportional Chamber for a Digital Radiographic Installation," Baru et al. no month.

2107a Nuclear Instruments & Methods of Physics Research A, A310 (1991) Dec. 1, "Data Acquisition for a Medical Imaging MWPC Detector", McKee et al. no month.

Nuclear Instruments and Methods 156 (1978) 1–17, "Applications of Proportional Chambers to Some Problems in Medicine and Biology, " pp. 1–17, Charpak. no month.

European Organization for Nuclear Research, "An Interesting Fall–Out of High–Energy Physics Techniques: . . . ", pp. 1–20, Charpak et al. 1976, no month.

European Organization for Nuclear Research, "The High-Density Multiwire Drift Chamber," Jeavons et al., 1974 no month.

"Digital Radiographic Installation for Medical Diagnostics," Institute of Nuclear Physics, pp. 1–25, 1989, Babichev et al no month.

Physics Letters, "The Multistep Avalanche Chamber: A New High-Rate, High-Accuracy Gaseous Detector," pp. 523–528, vol. 78B, No. 4, Oct. 9, 1978, Charpak et al.

*Primary Examiner*—David P. Porta
*Assistant Examiner*—David Vernon Bruce
*Attorney, Agent, or Firm*—Larson and Taylor

[57] ABSTRACT

The invention relates to a medical imaging device using X or gamma ionizing radiation. It comprises a source (S) of radiation in a divergent beam, and a longitudinal slit (F) delivering a sheet-form beam in a plane containing the slit (F). A detection module (1) is provided, which comprises a drift chamber (12) and a multiwire chamber which are filled with a gas. The chambers comprise, in a direction orthogonal to the plane containing the slit (F), the drift space (12) for the electrons, comprising a cathode electrode (11), a converter (121), a proportional multiplier anode (13) for generating multiplied electrons and corresponding ions, and a second cathode electrode (14), placed in the vicinity of the multiplier anode (13). The multiplier anode (13) and the second cathode electrode (14) consist of conductor elements extending in two parallel planes, along substantially orthogonal directions, in order to permit two-dimensional localization of the electrons in this plane.

9 Claims, 4 Drawing Sheets

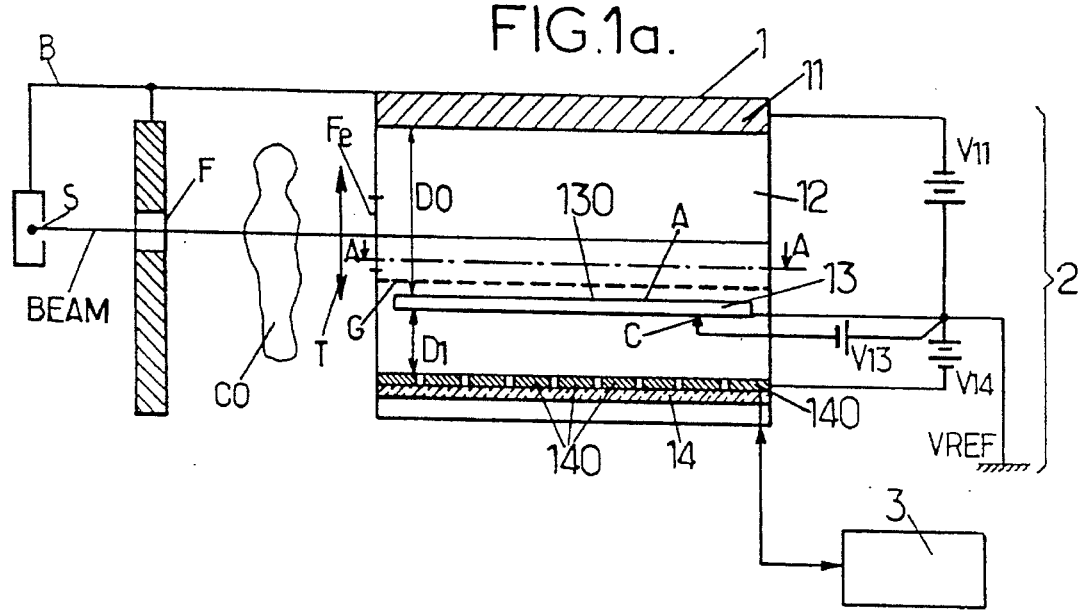
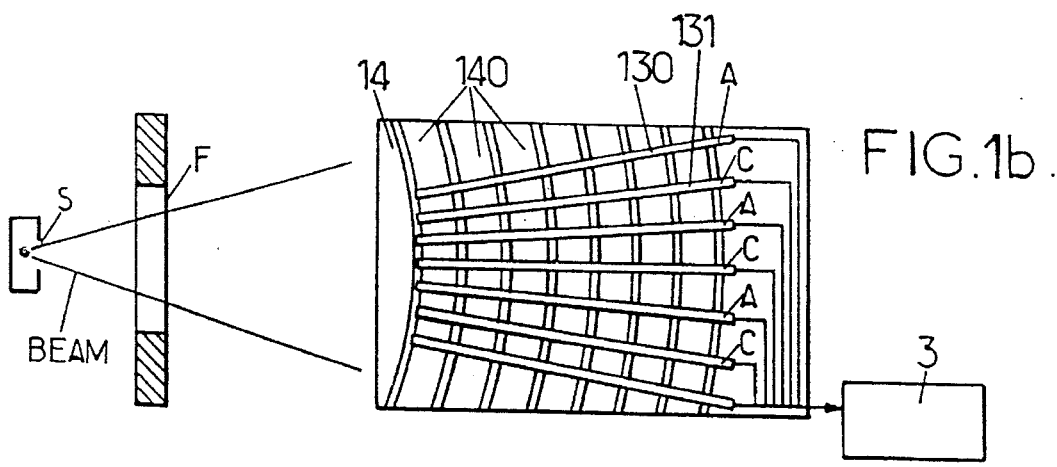

MEDICAL IMAGING DEVICES USING LOW-DOSE X OR GAMMA IONIZING RADIATION

The invention relates to medical imaging devices using low-dose X or gamma ionizing radiation.

In the field of X-ray medical imaging, a major problem has to date consisted in the difficulty of absorption by the gas detectors with a probability close to 1 of the X-radiation used in medical imaging without providing sufficiently large thickness dimensions of these detectors, which impairs, on the one hand, the compactness of the corresponding equipment and, on the other hand, their resolution accuracy.

In the field of X-ray crystallography, the energies of this radiation used are of the order of 10 keV and the mean path of this radiation for a gas such as xenon exceeds several centimeters at atmospheric pressure, which makes it practically impossible to produce an accurate detector with large area and small thickness without considerably increasing the pressure of the gas, which resultingly imposes practically prohibitive mechanical standards for constructing these detectors.

Various solutions have been proposed in order to attempt to overcome the abovementioned drawbacks.

A first solution consisted, for example, in placing the X-ray source at the center of a spherical beryllium window, which limits input to a gaseous space absorbing the X-rays. The rear face of the gaseous space, constituting a drift space for the electrons generated in the gaseous medium by the X-radiation, comprises a concentric grid placed a large distance, of the order of 10 cm, away. The volume of the drift space is filled with a gaseous mixture consisting predominantly of xenon. A potential difference is applied between the window and the output grid, which causes drifting of the ionization electrons released by a beam of the X-radiation emitted in a given direction in space, along a radius of the sphere. Suitable electric fields may then make it possible to localize these electrons by virtue of a multiwire chamber and thus to obtain an image whose accuracy is not impaired by the large thickness of the detector, because the response of the assembly is independent of the position of the absorption point of each X-ray photon along a radius of the spherical space. For a description of this mode of operation, reference may be made to the article entitled "Applications of proportional chambers to some problems in medicine and biology", published by G. Charpak, Nuclear Instruments and Methods 156 (1978) 1–17, North-Holland Publishing Co. CERN, Geneva, Switzerland.

However, the aforementioned mode of operation cannot be envisaged for the field of medical imaging because it is then necessary to use X-rays whose energy is greater than 25 KeV, the mean absorption length of these rays becoming prohibitive at atmospheric pressure.

Other solutions have been proposed. One of these consists in using thin sheets of heavy metals, making it possible to absorb the X-rays expediently. However, the electrons detached from these sheets by Compton or photoelectric effect have a much smaller mean path than the mean path of an X-ray. Consequently, in the case when it is desired to produce a detector localizing the X or gamma rays by means of localizing the aforementioned detached electron, the gas detector being, for example, placed against the lead sheet, the actual efficiency of the process employed is in general between 1/1000 and 1/100.

In order to overcome this difficulty, it has been proposed to impact on the thin sheets under grazing incidence or, if appropriate, to provide stretchers consisting of sheets or tubes placed such that the Compton or photoelectric electrons extracted from the sheets or from the walls of the tubes penetrate into the gaseous spaces separating the sheets or filling the tubes and ionize the gas therein, the ionization electrons then being extracted and then conveyed by an electric field into a drift space where a multiwire chamber can localize them. Such a mode of operation has been described, in particular, by the articles entitled "An interesting fall-out of high-energy physics techniques: the imaging of X-rays at various energies for biomedical applications" by G. Charpak and F. Sauli, CERN, Geneva, Switzerland, April 1976 and "The high-density multiwire drift chamber" by G. Charpak, A. P. Jeavons, R. J. Stubbs, CERN-Data Handling Division DD/74/31, November 1974.

These designs, of which there are different forms, aim to stack a large number of thin sheets, each having a low X-ray absorption efficiency, but proceeding so that only one multiwire chamber can localize the electrons extracted from hundreds of successive sheets which are thin enough to allow the electrons detached by the X-rays to leave.

Finally, a second solution, applied in medical radiography, has been described in the article published by E. A. Babichev, S. E. Baru, V. V. Grusew, A. G. Khabakhpashev, G. M. Kolachev, G. A. Savinov, L. I. Sekhtman, V. A. Sidorov, A. I. Volobuev and entitled "Digital Radiographic Installation for Medical Diagnostics"- Institute of Nuclear Physics, Novosibirsk - 1989. In this second solution, the emitted X-rays illuminating the body of an object or of a patient to be observed are absorbed in a gaseous space filled with xenon under a pressure of 3 bar, this space being bounded by a straight slit made in a lead plate, forming a diaphragm and making it possible to generate a sheet-form illumination beam. The ionization electrons produced in this gaseous space by the absorbed X-rays drift under the effect of an electric field towards a multiwire chamber, the wires of which, in a plane parallel to the plane containing the sheet-form illumination beam delivered by the slit, are convergent towards the point X-ray emission source.

The result of this is that ionization electrons originating from a beam of rays in the sheet-form beam emitted in a given direction by the source are concentrated onto a single wire in the multiwire chamber. Counting electronics makes it possible to determine the number of pulses on each wire, which makes it possible to obtain a measure of the intensity of the X-rays transmitted in each of the directions of the wires.

Since the measurements obtained in this way are spatially limited to the intensity of the X-rays of the sheet-form beam delivered by the slit, the latter and the source are displaced along the body to be observed in order to scan the entire body to be observed.

The above-described solution has, however, the following drawbacks.

In order to compensate for the gain variation in the chamber, caused by the divergence of the wires, it is necessary to vary the distance separating the anode wires from the grid or from the cathode plane, so as to keep the amplification around a wire constant.

Such devices therefore require very careful construction of the chamber and of the divergent wires, the detection accuracy of the assembly remaining connected with the constructional quality.

Furthermore, since the gain parameters are connected with the structure of the detection device, the wires diverging away from the direction of the X-ray emission source, the device described by the aforementioned article at best allows a mode of use adapted to one single defined configuration of the distance from the X-ray emission source to the body to be observed and to the detection chamber thus formed. It is not therefore possible to envisage varied applications or observation conditions as are sometimes required for medical observation operations.

The object of the present invention is to provide substantial improvements to the devices of the prior art, in particular with constructional simplification.

Another object of the present invention is to implement medical imaging devices using a low-dose X or gamma ionizing radiation.

The medical imaging device using low-dose X or gamma ionizing radiation which forms the subject matter of the present invention comprises a source of ionizing radiation in a divergent beam, a longitudinal slit forming a diaphragm making it possible to deliver a sheet-form illumination beam distributed substantially in a plane containing the longitudinal slit, and a module for detecting a beam transmitted by the sheet-form illumination beam.

It is noteworthy in that the detection module comprises a drift chamber and a multiwire chamber which are filled with a gas making it possible to generate electrons. These chambers comprise, arranged in a direction orthogonal to the plane containing the slit and the sheet-form illumination beam, a drift space for the electrons, comprising a first cathode electrode, and an electron proportional multiplier anode for generating multiplied electrons and corresponding ions, and a second cathode electrode placed in the vicinity of the multiplier anode. The multiplier anode and the second cathode electrode consist of conductor elements extending in two planes parallel to that of the sheet-form illumination beam, along substantially orthogonal directions, in order to permit two-dimensional localization of the electrons in this plane.

The medical imaging device which forms the subject matter of the present invention finds an application in medical imaging using X or gamma ionizing radiation, in biology and, more generally, in the field of the visualization of opaque bodies.

A more detailed description of a medical imaging device using X or gamma radiation, according to the subject matter of the present invention, will now be given below in conjunction with the drawings, in which:

FIG. 1a schematically represents an overall view in longitudinal section of the medical imaging device which forms the subject matter of the present invention;

FIG. 1b represents a sectional view of FIG. 1a, along the section line AA thereof, in a first advantageous embodiment;

Figure 2A:
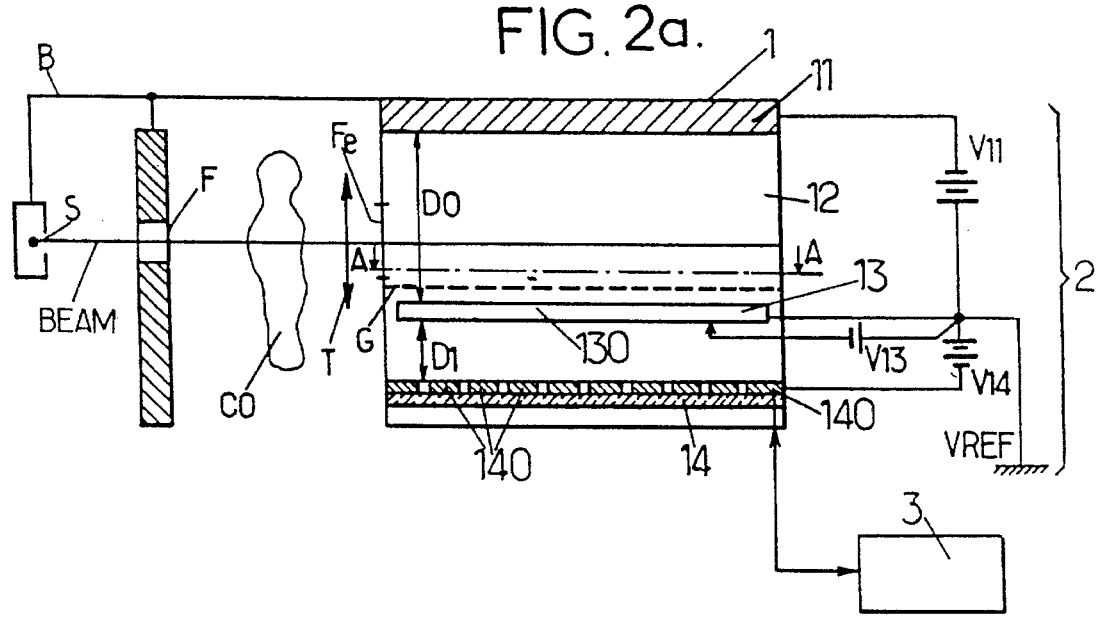
Figure 2B:
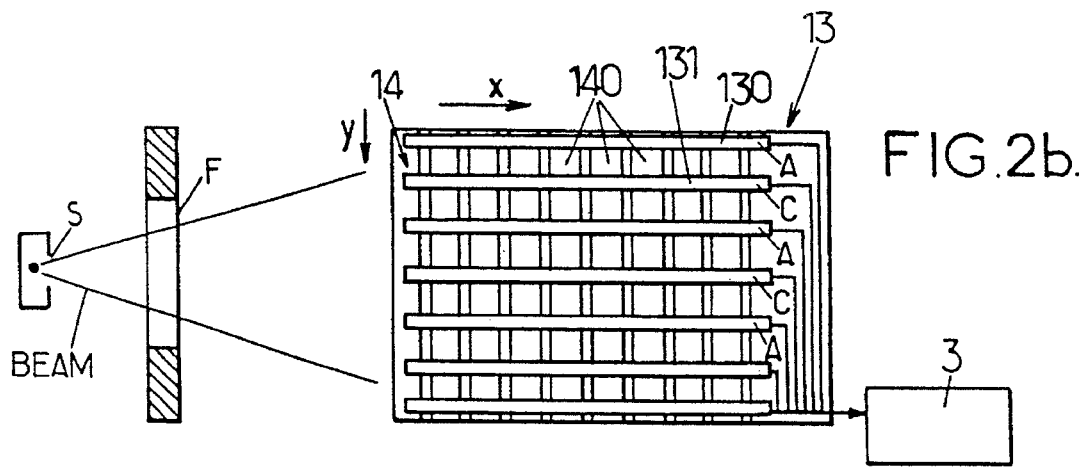
Figure 3:
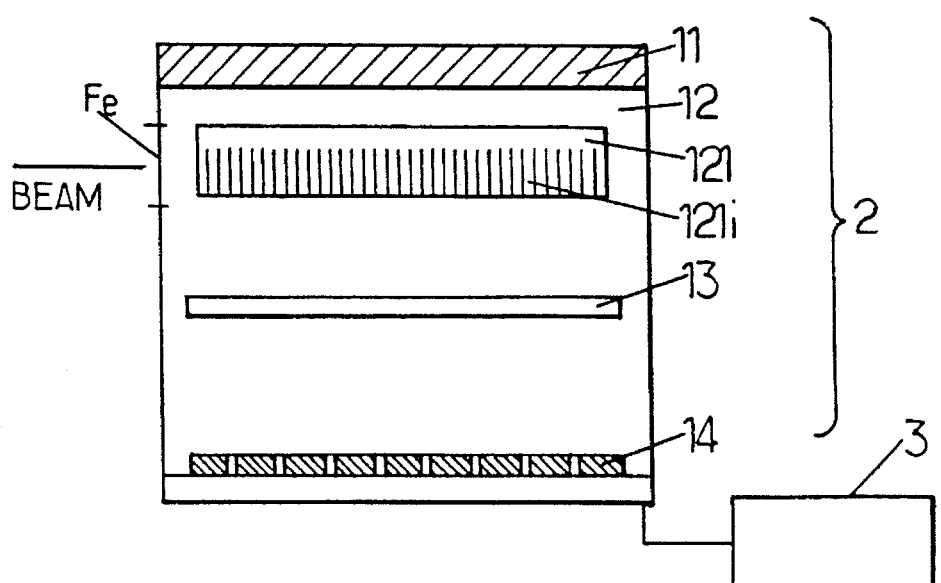
Figure 4A:
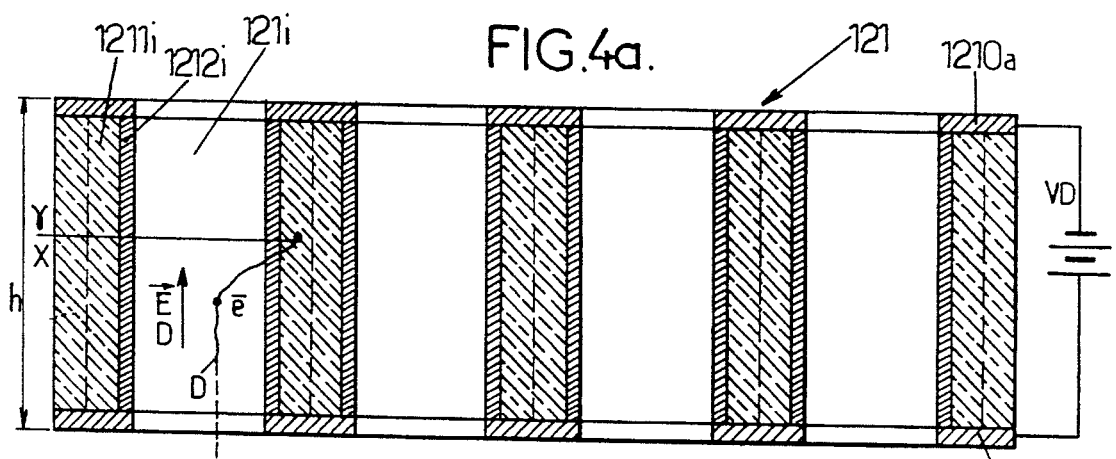
Figure 4B:
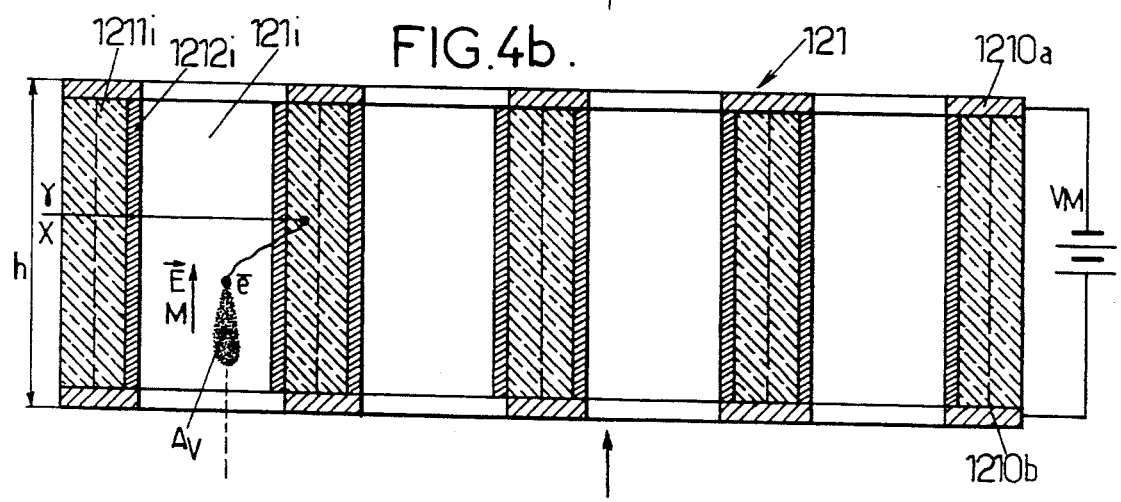
Figure 4C:
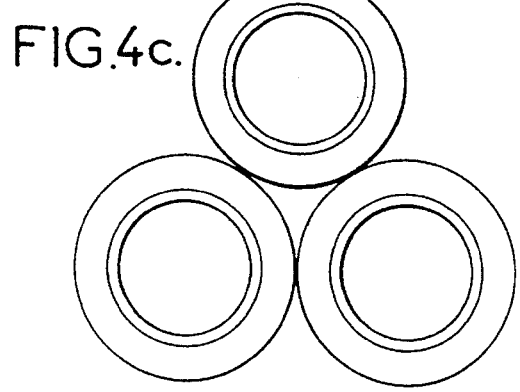
Figure 4D:
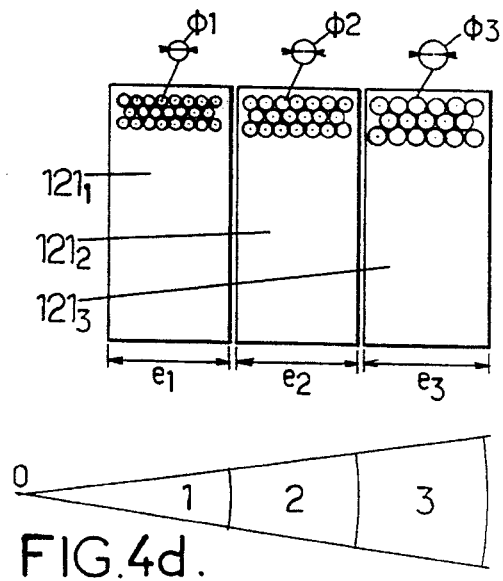

FIG. 2a schematically represents an overall view in longitudinal section of the medical imaging device which forms the subject matter of the present invention;

FIG. 2b represents a sectional view of FIG. 2a, along the section line AA thereof, in a second advantageous embodiment;

FIG. 3 represents a particular embodiment of the device which forms the subject matter of the present invention;

FIGS. 4a and 4b represent a view in longitudinal section of a converter with a multichannel structure used for implementing the device according to the invention, according to a first and second mode of use;

FIG. 4c represents a front view, along the arrow, of FIGS. 4a and 4b;

FIG. 4d represents a particular advantageous embodiment of the converter represented in FIG. 4a or FIG. 4b, especially intended to be used with complex ionizing radiation including a plurality of energy levels or lines.

A more detailed description of a medical imaging device and of the improvements made to this type of apparatus, according to the subject matter of the present invention, will now be given in conjunction with FIG. 1a and the following figures.

In general, it is indicated that, throughout the drawings, the proportion of the scales, distances or dimensions is not respected, so as not to impair the clarity of the disclosure.

FIG. 1a represents a view in longitudinal section, that is to say along a plane orthogonal to a plane containing a sheet-form ionizing-radiation illumination beam, this illumination beam being generated by the device which forms the subject matter of the present invention. Thus, the plane of the illumination beam is orthogonal to the plane of the sheet on which FIG. 1a is represented.

As represented in the aforementioned figure, it is indicated that the device forming the subject matter of the present invention comprises a source, denoted S, of ionizing radiation which emits a divergent ionizing-radiation beam, and a longitudinal slit, denoted F, extending orthogonally to the plane of the sheet on which FIG. 1a is represented. This slit F forms a diaphragm and makes it possible to deliver a sheet-form illumination beam. The sheet-form beam is, in the conventional manner, distributed substantially in a plane containing the longitudinal slit F and the source S. According to a particularly advantageous aspect of the medical imaging device forming the subject matter of the present invention, it is indicated that the latter comprises a detection module 1, which makes it possible to detect a beam transmitted by a body CO to be observed. The body CO is, for example, the body of a patient which is illuminated by the sheet-form illumination beam, the body to be observed then transmitting a transmitted ionizing-radiation beam. This transmitted beam has undergone various absorptions as a function of the density of the body through which it has passed.

As represented in the aforementioned FIG. 1a, the detection module 1 is, of course, positioned so as to receive the transmitted ionizing-radiation beam. In the conventional manner, the source S, the slit F and the detection module 1 may be solidly attached to a frame B which can be made movable in translation and in rotation with respect to the body CO to be observed, the translational and rotational movement of the assembly being symbolized by the arrow T in FIG. 1a.

According to a particularly advantageous aspect of the device forming the subject matter of the present invention, it is indicated that the detection module 1 successively comprises a drift chamber and a multiwire chamber, these chambers being filled with a gas making it possible to generate electrons subsequent to the illumination of this gas by the transmitted ionizing beam.

Advantageously, it is indicated that the drift chamber and ionization chamber are filled with one and the same gas such as, for example, xenon, at a pressure higher than atmospheric pressure, so as to ensure a sufficient gas density.

The detection module 1 comprises a window Fe, placed behind a collimator, which makes it possible to input the transmitted illumination beam into the drift space of the drift chamber in order to ensure the creation of electrons by interaction of the ionizing radiation with the gas contained in the aforementioned drift space.

According to a particularly advantageous aspect of the device forming the subject matter of the present invention, as represented in FIG. 1a, it is indicated that the chambers, namely the drift chamber and multiwire chamber forming the detection module 1, comprise, arranged in a direction orthogonal to the plane containing the slit F and the sheet-form illumination beam, an electron drift space, denoted 12, which comprises, in the conventional manner, a first cathode electrode denoted 11.

According to a particularly advantageous aspect of the device according to the invention, an electron proportional multiplier anode, denoted 13, is also associated with the aforementioned drift space 12, this grid making it possible to generate multiplied electrons and corresponding ions. The multiplied electrons and the corresponding ions are generated by a localized avalanche phenomenon in the vicinity of the anode 13 which in fact forms an electron proportional multiplier electrode. The drift space 12 may, if appropriate, be bounded by an intermediate grid G placed at an intermediate potential.

The multiwire chamber, represented in FIG. 1*a*, associated with the drift space furthermore comprises, in the vicinity of the anode 13, downstream thereof in the drift direction of the electrons originating from the drift space, a second cathode electrode, denoted 14, which is placed in the vicinity of the multiplier anode 13.

According to a particularly advantageous aspect of the device forming the subject matter of the present invention, it is indicated that the multiplier anode 13 and the second cathode electrode 14 advantageously consist of conductor elements, 130 and 140 respectively, extending in two planes parallel to the plane of the sheet-form illumination beam along substantially orthogonal directions in order to permit two-dimensional localization of the electrons in a plane parallel to the two aforementioned planes.

According to another particular characteristic of the device forming the subject matter of the present invention, as represented in FIG. 1*a*, it is indicated that the drift chamber 12 and the multiwire chamber bounded by the proportional multiplier anode 13 are formed by an asymmetric chamber, as represented in the aforementioned figure. Under these conditions, the drift space 12 has, in the direction orthogonal to the plane containing the slit and the illumination beam, a dimension d0 greater than the distance d1 in the same direction separating the proportional multiplier anode 13 from the second cathode electrode 14. Similarly, the distance between the grid G and the plane 13 may be greater than the distance between the multiplier anode 13/second cathode electrode 14.

In general, as represented in FIG. 1*a*, it is indicated that a negative voltage $V_{11}$ is applied to the first cathode 11 by means of a suitable polarization source with respect to the reference voltage VREF. The potential of the first cathode 11 may, for example, be chosen to be equal to $V_{11}=10$ kV.

Furthermore, it is indicated that the reference potential, for example, may be applied to the proportional multiplier anode 13.

However, in order to constitute the proportional multiplier anode, it is indicated that the latter may be formed by straight wires contained in one and the same plane, the reference voltage VREF being applied to some of these wires, and a voltage, for example negative with respect to this reference voltage and denoted $V_{13}$ in FIG. 1*a*, being, in contrast, applied to wires intermediate to the former wires, in order successively to constitute an alternation of anode wires, denoted A, and cathode wires, denoted C, respectively. The potential $V_{13}$ may, for example, be equal to: −1 kV, for example, with respect to the reference voltage.

Finally, it is indicated that a potential, denoted $V_{14}$ in FIG. 1*a*, can then be applied to the second cathode 14, consisting of conductor elements 140 extending in a plane parallel to the plane of the proportional multiplier anode 13.

In general, it is indicated that this potential $V_{14}$ is a mean potential for the set of the conductive bands 140 constituting the second cathode 14.

From the point of view of operation, it will be understood that the conductor wires 130, represented in FIG. 1*a*, constituting the proportional multiplier anode 13 and the constituent bands 140 of the second cathode 14 may advantageously be connected to counting means 3 which make it possible to localize, in the orthogonal directions of the wires 130 and the bands 140, respectively, the impacts of the multiplied electrons formed by avalanche effect, in order to permit two-dimensional localization of these electrons in a plane substantially parallel to the plane of the illumination beam.

A first particularly advantageous embodiment of the medical imaging device forming the subject matter of the present invention will now be described in conjunction with FIG. 1*b*.

FIG. 1*b* is a view in section along the section plane AA in FIG. 1*a*.

As represented in FIG. 1*b*, it is indicated that the multiplier anode 13 is formed by conductor wires forming a proportional multiplier grid, these conductor wires being denoted 130 in FIG. 1*b*.

It will be understood, in particular, that the wires 130 may advantageously be connected to the reference potential, whereas the wires 131 may in contrast be connected to the voltage source $V_{13}$ represented in FIG. 1*a*, so as to constitute successive anode A and cathode C wires, respectively, and thus to produce a proportional amplifier anode.

Typically, it is indicated that the anode A wires 130 may consist of wires with small cross section, that is to say a diameter of between 10 to 20 μm, whereas the cathode C wires 131 may have a diameter of between 40 and 60 μm.

As represented in FIG. 1*b*, it is indicated that the conductor wires 130, 131 forming the proportional multiplier anode 13 are placed in the plane containing the aforementioned multiplier anode 13 and are directed so as to converge toward the source S of the illumination beam.

In this embodiment, as represented in FIG. 1*b*, the second cathode electrode 14 is then advantageously formed by concentric electrically conductive bands centered on the source of the illumination beam.

The set of electrically conductive bands constituting the second cathode 14 is subjected to a potential gradient increasing according to the position of each band with respect to the source S of the illumination beam. Such a measure makes it possible to compensate for the variation in the electron multiplication gain of the amplifier anode electrode 13 because of the divergence of the wires constituting it.

It will therefore be understood that the arrangement of the constituent wires 130, 131 of the proportional multiplier anode 13 and the corresponding arrangement of the conductive bands 140 of the second cathode 14 can then make it possible to perform a two-dimensional localization according to a detection substantially in polar coordinates of the impact of the multiplied electrons with respect to the source S.

To this end, it will of course be understood, as represented in FIG. 1*b*, that the constituent wires 130 of the proportional multiplier anode are connected to a counting system, each wire localizing one polar coordinate, without it being necessary to count the signals induced on the bands 140. The connection between the counting module 3 can then be produced so as to count the pulses, the potential variations caused by the impact of the electrons multiplied by avalanche effect at the aforementioned bands and wires then being transmitted for counting to the counting module 3 mentioned above.

As regards the advantageous embodiment represented in FIG. 1b, it is indicated that, in comparison with the devices of the prior art as previously indicated in the description, the medical imaging device forming the subject matter of the present invention is of major benefit in so far as it is no longer necessary to ensure a variable distance interval between the constituent wires of the proportional multiplier anode 13 and of the second cathode 14, as proposed in the devices of the prior art, in order to compensate for the gain variation along the wires of the amplifier anode 13.

Another advantage of the aforementioned embodiment resides in the fact that the chamber may thus be deep, without drawbacks.

Figure 1C:
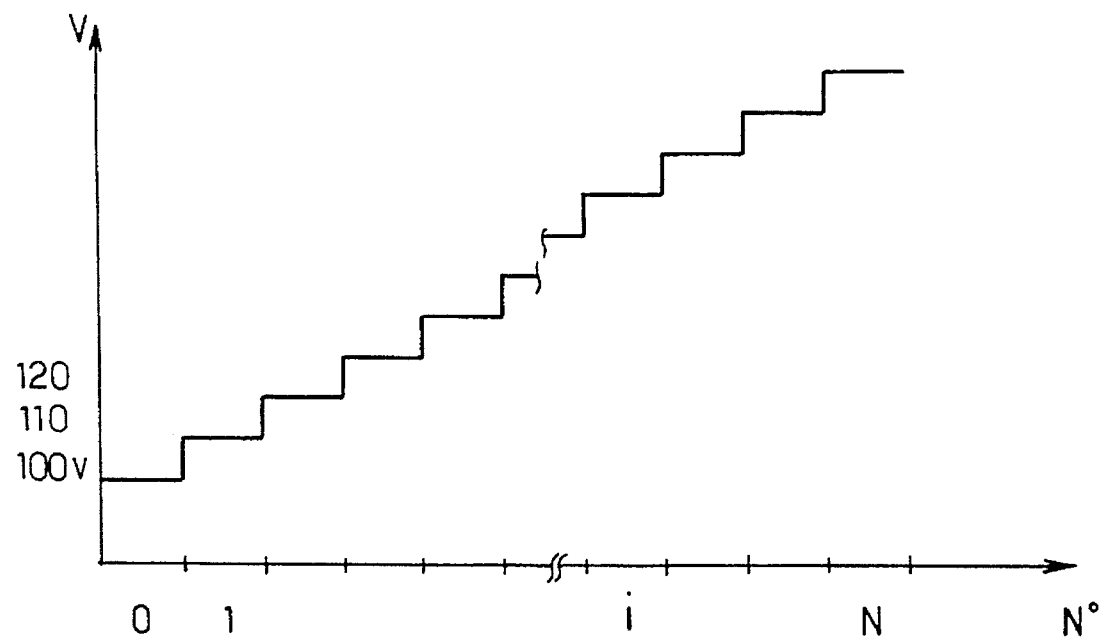
FIG. 1c represents a diagram of DC voltages applied to the second cathode of the device according to the invention represented in FIG. 1a, in order to compensate for the gain variation generated because of the specific structure of the anode.

In a practical embodiment, it is indicated that the conductive bands 140 may be formed on a board of the printed circuit board type, it being possible for these bands to have a width of a few mm to 1 cm and to be each placed, as represented in FIG. 1c, at a constant potential for each of the bands, the band closest to the source S being placed, for example, at a potential of 100 volts, and each band successively having its potential increased by 10 volts, for example, as a function of the row number of the band in question.

In view of the embodiment in FIG. 1a and 1b, it is indicated that it is thus possible to construct chambers whose planar dimensions in the plane of FIG. 1b, for example, may be equal to 10 cm in the direction of propagation of the illumination beam, and approximately 50 cm in a direction perpendicular to this first direction of propagation of the illumination beam.

In FIG. 1b, the proportions of the aforementioned dimensions have intentionally not been respected, in order not to impair the clarity of the drawing.

A more detailed description of a second variant embodiment of the medical imaging device forming the subject matter of the present invention will now be given in conjunction with FIGS. 2a and 2b.

In FIG. 2a, the same references represent the same elements as those previously described in conjunction with FIG. 1a, and the operation of the device forming the subject matter of the present invention as represented in FIG. 2a is similar to that of the device in the first embodiment represented in FIG. 1a.

However, as has been represented in FIG. 2b, in a sectional view along the section plane AA of FIG. 2a, the proportional multiplier anode 13 is formed by conductor wires forming a proportional multiplier grid, these conductor wires, again having the references 130 and 131, similarly forming the successive anode A and cathode C wires but being this time directed toward the source S, but parallel to one another.

In this case, the second cathode electrode 14 is then formed by mutually parallel electrically conductive bands extending in a direction orthogonal to that of the conductor wires 130, 131 forming the proportional multiplier grid 13.

It will thus be understood that, since the conductive bands 140 and the wires 130, 131 as represented in FIG. 2b are connected to the counting module 3, it is then possible to perform two-dimensional location according to detection in cartesian coordinates x, y of the impact of the multiplied electrons.

In the second embodiment as represented in FIGS. 2a and 2b, it is indicated that the space d1 separating the proportional amplifier anode 130 and the second cathode 14 may be chosen to be very small, that is to say of the order of, for example, a half millimeter.

The bands 140 may be constituted on a printed circuit and have a width of 2.5 mm.

In the embodiment in FIGS. 2a and 2b, an X or gamma ray emitted in a given direction θ generates freed electrons in the gas in the drift chamber along a straight line segment which cuts a plurality of wires 130, 131 of the proportional multiplier anode 13.

Localization of the multiplied electrons in the x and y directions according to the address of the wires and bands, respectively, subjected to the impact of the avalanches thus formed along the aforementioned trajectory then permits the localization of the aforementioned direction in the cartesian reference frame mentioned above.

Because of the use of a small-value interval d1 separating the proportional amplifier anode from the second cathode 14, the second embodiment as represented in FIGS. 2a and 2b makes it possible to use very high counting rates, such as those required, for example, in X-ray radiography.

By way of nonlimiting example, it is indicated that, for a proportional amplifier anode substantially including one anode wire 130 or 131 per millimeter, it is easy to reach counting rates of $10^5$ pulses/second per millimeter of wire. For a 10 cm wire length, as mentioned above, in the x direction, it is thus possible to reach a counting frequency of 1 MHz per wire.

The signals obtained can then be shaped using electronic circuits making it possible to generate a square pulse with a width of substantially 10 nanoseconds.

The signals obtained on the bands 140 have opposite signs and can easily be employed for performing localization according to the cartesian coordinates x, y.

It is thus possible to constitute a detection matrix including 500 wires, for example, and 40 bands, and means for storing the pulses detected by the aforementioned matrix assembly should then be provided in order to obtain a map of the impacts of the multiplied electrons in the detection plane.

Whereas, in the devices of the prior art, the convergence of the wires toward the source S had the advantage of integrated detection on one and the same wire for a given direction θ corresponding to that of the wire, the medical imaging device as represented in FIGS. 2a and 2b permits, in contrast, detection for a given direction θ with respect to a cartesian matrix x, y, the only constraint on which is the employment of memory circuits capable of storing the positions or addresses of the points of impact in the aforementioned x and y directions.

It should furthermore be noted that it is easy to subdivide each printed band 140 into as many independent segments as necessary, in order to allow adaptation to the counting rate permitted by the electronics used.

In the embodiment as represented in FIGS. 2a and 2b, it is indicated that this device has a major advantage insofar as it is sufficient to modify the programs for processing the pulses detected in the x and y directions as a function of the relative position of the detection matrix thus constituted with respect to the source S, whereas in the embodiment described in conjunction with FIGS. 1a and 1b, and in the devices of the prior art, the convergence of the constituent wires of the multiplier anode 13 virtually demands the use of a detection matrix whose distance is substantially fixed with respect to the source S, which may impose serious limitations as to the clinical use of such devices.

Finally, as represented in FIG. 3, the medical imaging device forming the subject matter of the present invention, both in its first and second embodiments, may be provided in the drift space 12 with an ionizing-ray/electron converter 121, this converter 121 being constituted by a multichannel mechanical structure 121i. Each channel in the multichannel structure extends longitudinally in a direction parallel to the direction orthogonal to the plane containing the longitudinal slit and the sheet-form illumination beam, and has an open end oriented toward the proportional multiplier electrode 13.

The multichannel structure 121 may be formed by a material such as lead glass, for example, the impact of the ionizing radiation on the aforementioned structure having the effect of generating electrons which are then freed in the drift space to generate the aforementioned avalanche phenomena.

A more detailed description of the converter 121 and of the mode of operation of the latter in several successive variants will now be given in conjunction with FIGS. 4a to 4d.

FIGS. 4a and 4b represent, in a longitudinal section, the converter 121 as represented previously in FIG. 3.

The X-ray converter 121 is produced by a microchannel structure, it being possible for this structure to be a structure normally available on the market, and marketed by the companies Philips and Hammamutsu.

Such a converter has a major practical importance because it makes it possible to reduce greatly the dimension of the detection device in the source/object direction of propagation of the ionizing radiation.

As has been represented in FIGS. 4a and 4b, the converter 121 is formed by a network of microchannels, each being denoted 121i, which actually consist of glass tubes placed side by side. The glass tubes have a thickness of the order of 2 μm, the wall of the glass tubes having reference 1211i in the aforementioned figures. The height h of the assembly, that is to say substantially of the glass tubes, is of the order of 1 mm.

A metallic gold deposit is produced on the faces of the microchannel structure, this metallic gold deposit having the references 1210a, 1210b in FIGS. 4a and 4b. The metallic gold deposits are produced so as to constitute a through hole for each hole 121i.

The diameter of each hole 121i may, for example, be between 10 μm and 20 to 30 μm.

It will be understood that the microchannel structure thus produced makes it possible, by way of nonlimiting example, for 12 μm diameter holes and a 2 μm thick wall of the glass tubes, for example, to produce a structure of which 25% of the volume is occupied by glass. Such a structure has a mean density of 0.7 g/cm$^3$, whereas, in the absence of a microchannel structure, the gas present in the chamber, such as xenon, for example, under a pressure of 5 bar, has a density of substantially 0.03 g/cm$^3$.

The introduction of the microchannel structure therefore permits a factor of 20 gain in mean density, and therefore a corresponding capture probability, which largely compensates for the difference in the absorption coefficients of glass and xenon for the photons of the ionizing radiation used.

With tubes having a 2 μm thick wall, the photoelectrons or the Compton electrons have a high probability of exiting the glass walls and emerging into the holes constituting the microchannels if they have an energy greater than a few KeV [sic].

The problem which then arises is merely that of producing enough ionization electrons in the gas contained in each of the holes 121i and of attracting these electrons into the drift or detection volume which follows.

To this end, and according to a particularly advantageous aspect of the device forming the subject matter of the present invention, an intense electric field E is created within each hole, this field being substantially longitudinal and parallel to the axis of each hole 121i.

To this end, the walls of each hole 121i have a coating 1212i consisting of an electrically conductive material having a high resistivity, this coating being, of course, electrically connected to the electrodes constituted by the gold coating 1210a, 1210b.

Under these conditions, it is then possible to apply either [sic]a drift voltage, denoted VD, as represented in FIG. 4a, between the electrodes 1210a and 1210b, any ionization electron emerging into one of the holes 121i then being subjected to a drift phenomenon because of the existence of the electric field $E_D$ represented in FIG. 4a.

It is indicated that the coating 1212i of each hole may be formed by a lead film with a thickness of a few tens of angstroms.

The gas used in the drift chamber may then be either a mixture of argon and 10% methane or of xenon including 10% dimethylethane [sic].

As regards the drift voltage VD applied to the electrodes 1210a, 1210b, it is indicated that it may be selected equal to $-2$ kilovolts for the electrode 1210a with respect to electrode 1210b, which makes it possible to generate a drift field $E_D$ sufficient to ensure drift of the electrons in each of the holes.

In contrast, as represented in FIG. 4b, for a structure identical to that in FIG. 4a, it is also possible to apply a higher voltage to the electrodes 1210a, 1210b, this voltage being denoted VM, in order to generate at each hole 121i a multiplication electric field, denoted $E_M$, this multiplication field making it possible in each of the holes to cause an avalanche phenomenon of the ionization electrons, the avalanche phenomenon being denoted Av in FIG. 4b.

The multiplied electrons can then be subsequently transferred, at least partially, into the space which follows, where they are drifted, either toward the multiplication space such as a multiwire chamber, as described above in the description, or toward a detection space such as a detection space with parallel faces, for example with microstrips.

In general, it is indicated that the parameters of the glass tubes, that is to say the diameter of the orifices or holes 121i and thickness of the walls 1211i of the latter, are chosen as a function of the energy of the ionizing X or gamma radiation to be detected.

Thus, for a low-energy radiation, it will be preferred to have holes or orifices with a diameter between 10 and 15 μm, for example, the holes and/or orifices of greater diameter being reserved for ionizing radiation with higher energy.

For example, for 25 keV energy X-rays used in mammography, it will preferably be possible to use microchannel tubes whose walls are thin, that is to say 2 μm thick walls mentioned above.

For 150 keV energy X or gamma rays, with a view to obtaining greater efficiency, the microchannel structures will preferably be chosen which consist of tubes whose walls have a thickness of the order of 100 μm.

Finally, in the case of industrial radiography used for the visualization of opaque bodies, the radiation then used having energies of a few MeV, thicker tubes may be used.

As regards the diameters of the tubes 121i, it is indicated that these diameters lie within the ranges of values previously mentioned in the description.

In the embodiment described, in which the height h over which it is necessary to extract the electrons is of the order of 1 mm, the mode of operation for extracting these electrons presents no major difficulty.

For holes produced over a height h=0.3 mm, for example, it is possible to obtain a very high efficiency when the gas used is a gas such as argon at atmospheric pressure.

In contrast, when very fine holes 121i, of small diameter, are used, it is then preferable to use a pressurized gas, in order:

to increase the number of ionization electrons over a short distance, to decrease the diffusion of the electrons, which varies as $1/\sqrt{P}$, where P represents the pressure of the gas, as well as their capture by the walls of the tubes.

It is furthermore indicated that multistage multiplication and drift spaces, as published by G. Charpak and F. Sauli, Phys. Lett. 78B (1978) 523, describing the electron multiplication and transfer mechanisms in the drift spaces, can be used in the same way as they are applied with the aforementioned tube structure.

With reference to FIG. 4d, it is also indicated that, in order to produce multienergy detection, that is to say detection for complex ionizing radiation formed by radiation or lines with discrete energy, it is possible, as represented in FIG. 4b, to use a microchannel structure 121 of complex structure, actually formed by a plurality of elementary structures, denoted by way of nonlimiting example $121_1$, $121_2$, $121_3$.

Each elementary microchannel structure actually constitutes an elementary converter, the structures being placed side by side in the mean direction of propagation of the ionizing radiation, as represented in FIG. 4d.

According to an advantageous characteristic of the microchannel structure thus produced, it is indicated that each elementary converter is formed by a microchannel structure in which the microchannels have parameters of hole diameter and wall thickness chosen as a function of hardness, that is to say the energy, of each component or line of the complex radiation used.

As represented in FIG. 4d, it is indicated that, for a complex ionizing radiation formed by three lines of low, 1, medium, 2, and high, 3 energy, it is then possible to use elementary converters $121_1$, $121_2$, $121_3$, which form the converter 121, the holes of smaller diameter being used for the first converter $121_1$ on the path of the ionizing radiation which is intended to detect the line with lowest energy, the elementary converter $121_2$ having holes of medium diameter, being adjacent to the first elementary converter $121_1$ and being intended to detect the medium energy line 2, and the third elementary converter $121_3$ being placed immediately after the elementary converter $121_2$ and intended to detect the line with the highest energy.

It will, of course, be understood that the choice of the values of the parameters relating to the tubes constituting each elementary converter is determined as described above in the description, and that the thickness dimensions of each elementary converter in the direction of propagation of the ionizing radiation, which dimensions are denoted $e_1$, $e_2$, $e_3$, in the direction of propagation of the ionizing radiation used, are determined by experiment and are directly linked with the mean free path of the X or gamma particles of the lines or components of the radiation used.

A medical imaging device using ionizing X or gamma radiation has thus been described which is particularly improved, insofar as, compared to the devices of the prior art, constructional simplifications of the drift chamber in particular have been provided, and, by virtue of the employment if appropriate of detection by a two-directional matrix in cartesian coordinates, it is possible in particular to envisage applications in which the user can then vary the distance separating the detection matrix used from the source S.

Furthermore, it will also be understood that, in the first embodiment, the use of a potential gradient applied to the second cathode 14 makes it possible, on the one hand, to simplify the construction of the entire medical imaging device, and also to implement fine adjustments to the successive potentials applied to the conductive bands.

I claim:

1. Medical imaging device using X or gamma ionizing radiation, comprising a source of ionizing radiation in a divergent beam, a longitudinal slit forming a diaphragm making it possible to deliver a sheet-form illumination beam distributed substantially in a plane containing the longitudinal slit, and means for detecting a beam transmitted by a body to be observed, illuminated by the sheet-form illumination beam, characterized in that said detection means comprise a drift chamber and a multiwire chamber which are filled with a gas making it possible to generate electrons, said chambers comprising, arranged in a direction orthogonal to the plane containing the slit and the sheet-form illumination beam:

a drift space for the electrons, comprising a first cathode electrode, an electron proportional multiplier anode for generating multiplied electrons and corresponding ions, a second cathode electrode, placed in the vicinity of the multiplier anode, said multiplier anode and the second cathode electrode consisting of conductor elements extending in two planes parallel to that of the sheet-form illumination beam, along substantially orthogonal directions, in order to permit two-dimensional localization of the electrons in this plane.

2. Device according to claim 1, characterized in that said multiplier anode is formed by conductor wires forming a proportional multiplier grid, said conductor wires, in the plane containing the multiplier grid, being directed in such a way as to converge toward the source of the illumination beam, and in that said second cathode electrode is formed by concentric electrically conductive bands centered on the source of the illumination beam, the set of electrically conductive bands being subjected to a potential gradient increasing according to the position of each band with respect to the source of the illumination beam, which makes it possible to compensate for the variation in the electron multiplication gain of the anode electrode due to the divergence of the wires constituting it, which makes it possible to perform said two-dimensional localization using detection in polar coordinates of the impact of the electrons.

3. Device according to claim 2, characterized in that it includes electrical polarization means making it possible to apply an electrical potential Vref+i$\Delta$V to each band in order to generate said potential gradient.

4. Device according to claim 1, characterized in that said multiplier anode is formed by conductor wires forming a proportional multiplier grid, said conductor wires, in the plane containing the multiplier grid, being directed toward the source and parallel to one another, and in that said second cathode electrode is formed by electrically conductive bands, parallel to one another and extending in a direction orthogonal to that of the conductor wires forming the proportional multiplier grid, which makes it possible to perform said two-dimensional localization using detection in cartesian coordinates of the impact of the electrons.

5. Device according to claim 2, characterized in that said wires constituting the proportional multiplier anode and said electrically conductive bands are connected to means for counting the impacts of electrons on them.

6. Device according to claim 1, characterized in that it includes, in the drift space, an ionizing-ray/ electron converter consisting of a multichannel mechanical structure.

7. Device according to claim 6, characterized in that the ionizing-ray/electron converter is formed by a plurality of elementary converters, aligned with the mean propagation direction of the ionizing radiation, each elementary converter being designed for detecting components with different hardness of a complex X or gamma ionizing radiation.

8. Medical imaging device using X or gamma ionizing radiation, comprising a source of ionizing radiation in a divergent beam, a longitudinal slit forming a diaphragm making it possible to deliver a sheet-form illumination beam distributed substantially in a plane containing the longitudinal slit, and means for detecting a beam transmitted by a body to be observed, illuminated by the sheet-form illumination beam, characterized in that said detection means comprise a drift chamber and a multiwire chamber which are filled with a gas making it possible to generate electrons, said chambers comprising, arranged in a direction orthogonal to the plane containing the slit and the sheet-form illumination beam:

a drift space for the electrons, comprising a first cathode electrode, and an ionizing-ray/electron converter consisting of a multichannel mechanical structure, an electron proportional multiplier anode for generating multiplied electrons and corresponding ions, a second cathode electrode, placed in the vicinity of the multiplier anode, said multiplier anode and the second cathode electrode consisting of conductor elements extending in two planes parallel to that of the sheet-form illumination beam, along substantially orthogonal directions, in order to permit two-dimensional localization of the electrons in this plane.

9. Device according to claim 8, characterized in that said multichannel mechanical structure forming the converter consists of a microchannel structure.

* * * * *